United States Patent
Pfeifer

(10) Patent No.: US 7,624,399 B2
(45) Date of Patent: Nov. 24, 2009

(54) COMMUNICATING MESSAGE WITH TYPE, OBJECT AND IDENTIFIERS FROM BUSINESS APPLICATION TO SERVICE APPLICATION

(75) Inventor: Wolfgang Pfeifer, Kerzenheim (DE)

(73) Assignee: SAP Aktiengesellschaft, Walldorf (DE)

( * ) Notice: Subject to any disclaimer, the term of this patent is extended or adjusted under 35 U.S.C. 154(b) by 376 days.

(21) Appl. No.: 10/811,063

(22) Filed: Mar. 25, 2004

(65) Prior Publication Data
US 2004/0237090 A1  Nov. 25, 2004

Related U.S. Application Data

(63) Continuation of application No. PCT/EP02/09388, filed on Aug. 22, 2002.

(30) Foreign Application Priority Data

Sep. 26, 2001 (EP) .................................. 01123076

(51) Int. Cl.
  G06F 3/00 (2006.01)
  G06F 9/44 (2006.01)
  G06F 9/46 (2006.01)
  G06F 13/00 (2006.01)
(52) U.S. Cl. .................. 719/316; 719/319; 709/218
(58) Field of Classification Search .......... 719/313, 719/316, 319; 707/103 Z; 715/703; 709/218
See application file for complete search history.

(56) References Cited

U.S. PATENT DOCUMENTS

| 4,731,735 | A | * | 3/1988 | Borgendale et al. ............. 707/4 |
| 5,367,635 | A | * | 11/1994 | Bauer et al. ................. 709/221 |
| 5,671,416 | A | | 9/1997 | Elson ......................... 395/702 |
| 5,819,257 | A | * | 10/1998 | Monge et al. .................. 707/2 |
| 6,105,035 | A | * | 8/2000 | Monge et al. ............ 707/103 R |
| 6,108,675 | A | * | 8/2000 | Gregg et al. ................. 715/519 |
| 6,192,371 | B1 | * | 2/2001 | Schultz .................... 707/103 R |
| 6,345,245 | B1 | * | 2/2002 | Sugiyama et al. ............. 704/10 |
| 6,360,230 | B1 | * | 3/2002 | Chan et al. .............. 707/103 R |
| 6,895,586 | B1 | * | 5/2005 | Brasher et al. .............. 719/313 |
| 7,089,530 | B1 | * | 8/2006 | Dardinski et al. ........... 717/105 |

OTHER PUBLICATIONS

Tanenbaum, Andrew S., "Computer Networks." Third Edition, Prentice Hall PTR, 1996; pp. 630-643.*

(Continued)

Primary Examiner—Diem Ky Cao
(74) Attorney, Agent, or Firm—Fish & Richardson P.C.

(57) ABSTRACT

Generally, in a computer system (901/902), a first computer (901) executes a business application (BA, 201) to represent components of an apparatus by corresponding objects and to relate the objects in a type-object hierarchy. A message generator (MG, 101) receives type-object hierarchy information from the application (201) and provides a message (105) with a type chain (1x) and an object chain (2x). Both chains (1x, 2x) in combination identify a target object that corresponds to a target component of the apparatus. A second computer (902) with a message interpreter (102) parses both chains (1x, 2x) to provide identification of the target component as well as identification of parent components with type and objects. The second computer (901) presents (951) type-object hierarchy information to a first user (M) by adding type statements in a first natural language; the second computer (902) presents (952) type identification to a second user (T) in a second natural language.

8 Claims, 9 Drawing Sheets

OTHER PUBLICATIONS

Umar, Amjad, "Object-Oriented Client/Server Internet Environments." Prentice Hall PTR, 1997; pp. 329-339.*

Zhonghua Yang and Keith Duddy, "CORBA: A Platform for Distributed Object Computing (A State-of-the-Art Report on OMG/CORBA)", ACM Operating Systems Review, vol. 30, No. 2, Apr. 1996, pp. 4-31.

Edmond Mesrobian, Richard Muntz, Eddie Shek, Silvia Nittel, Mark LaRouche, and Marc Kriguer, "OASIS: An Open Architecture Scientific Information System", Research Issues in Data Engineering, Feb. 26, 1996, pp. 107-116.

Aniruddha Gokhale and Douglas C. Schmidt, "Evaluating the Performance of Demultiplexing Strategies for Real-time CORBA", IEEE Global Telecommunications Conference, Nov. 3, 1997, pp. 1729-1734.

Michael Claben, "SAX and DOM and Rock'n Roll", http://webreference.com/xml/column11/2.html, Apr. 26, 2000, pp. 1-4.

Official Communication of Office Action of EP Application No. EP 01123076.0-2211 filed Sep. 26, 2001, (5 pages) mailed Apr. 5, 2007.

"*Java Object Serialization Specification*", Nov. 1998, Sun Microsystems (76 pages).

"*The Common Object Request Broker: Architecture and Specification, Version 2.3.1*", Oct. 1999, Object Management Group (62 pages).

Bourrett et al., "*A Generic Load/Extract Utility for Data Transfer Between XML Documents and Relational Tables*", IEEE, 2000 (10 pages).

Office Communication for EP Application No. EP01123076.0-2201; 4 pages mailed Jul. 17, 2002.

International Search Report for PCT Application No. PCT/EP02/09388; 3 pages mailed Jul. 1, 2004.

Official Communication of Office Action of EP Application No. EP01123076.0-2211 filed Sep. 26, 2001; 5 pages mailed Aug. 7, 2007.

Official Communication of Office Action of EP Application No. EP01123076.0-2211 filed Sep. 26, 2001; 5 pages mailed Nov. 7, 2007.

Summons to attend Oral Proceedings for EP Application No. EP01123076.0-2211 filed Sep. 26, 2001; 10 pages mailed Feb. 14, 2008.

* cited by examiner

| A, W, E, V, I | D-ABCD, 2200, 2220, 2222, 9876 |
|---|---|
| TYPE CHAIN | OBJECT CHAIN |

| AIRPLANE°° | D-ABCD |
| WING°° | PORT°° |
| ENGINE°° | OUTER°° |
| CHECK°° | AIR VALVE°° |
| IDENTIFICATION°° | 9876 |

| TYPE | Reference | ID |
|---|---|---|
| Airplane °° | 1000 | D-ABCD |
| Fuselage °° | 1400 | ⋮ |
| Wing °° | 1100 | ⋮ |
| Engine °° | 1110 | ⋮ |
| ⋮ | ⋮ | ⋮ |
| Wing °° | 1200 | ⋮ |
| Engine °° | 1210 | ⋮ |
| Engine °° | 1220 | ⋮ |
| Valve °° | 1221 | ⋮ |
| Valve °° | 1222 | 9876 |
| ⋮ | ⋮ | ⋮ |
| Seat °° | 1310 | ⋮ |

| TYPE | Reference | ID |
|---|---|---|
| Airplane ° | 1000 | D-ABCD |
| Fuselage ° | 1400 | ⋮ |
| Wing ° | 1100 | ⋮ |
| Engine ° | 1110 | ⋮ |
| ⋮ | ⋮ | ⋮ |
| Wing ° | 1200 | ⋮ |
| Engine ° | 1210 | ⋮ |
| Engine ° | 1220 | ⋮ |
| Valve ° | 1221 | ⋮ |
| Valve ° | 1222 | 9876 |
| ⋮ | ⋮ | ⋮ |
| Seat ° | 1310 | ⋮ |

COMMUNICATING MESSAGE WITH TYPE, OBJECT AND IDENTIFIERS FROM BUSINESS APPLICATION TO SERVICE APPLICATION

CLAIM OF PRIORITY

This application is a continuation application of the international application number PCT/EP02/09388 filed on Aug. 22, 2002, and designating the U.S., which claims priority from EP Application No. 01123076.0, filed Sep. 26, 2001.

FIELD OF THE INVENTION

The present invention generally relates to data processing and, more particularly, relates to computer systems, computer programs, and methods to identify objects of business applications.

BACKGROUND OF THE INVENTION

Computer applications often use object-oriented programming techniques. Data structures, hereinafter "objects", have data and functions, also referred to as properties and methods. To retrieve data from an object or to execute its method, the object has to be identified. This is especially important during run-time. Object-hierarchies are convenient. To work with an object, it must be located in the hierarchy. However, when two different run-time environments communicate, both environments need to go through the hierarchy. Communication middleware is known in the art, for example, under the terms COM, DCOM, and CORBA.

For example, a first run-time environment (provider) needs to communicate at multiple hierarchy levels with a second run-time environment (consumer) until the second environment operates with the identified object. Going through multiple hierarchy levels by both environments technically causes network load and delays. Also, objects in both hierarchies often operate under different technical conditions. For example, the provider uses a first object model and defines the object "identification" by a string with a predetermined number of characters; the consumer however uses a second object model and defines the corresponding object by an integer. The difference in the object models are often caused by the use of different programming languages in both environments.

There is an ongoing need to provide improved identification means so that some or all of the above disadvantages are mitigated.

SUMMARY OF THE INVENTION

The present invention relates to a computer system for identifying a target component in an apparatus that has components related in a hierarchy. The computer system has a first computer executing a first application to represent the components by corresponding objects, wherein the first application relates the objects in a type-object hierarchy. The system further has a second computer coupled to the first computer via a network. The first computer has a message generator that receives type-object hierarchy information from the application and that provides a message with a type chain in parent-child direction and an object chain also in parent-child direction. Both chains in combination identify a target object that corresponds to the target component. The second computer has a message interpreter that parses both chains to provide identification of the target component with type and object as well as identification of the parent components with types and objects.

Providing target identification as well as parent identification allows a user of the second computer to find the target component in the hierarchy of other components. The message is the common communication means for both computers. Generating and parsing the message is independent from computer operating systems, run-time environments and programming languages.

Preferably, the first computer presents type-object hierarchy information to a first user and thereby adds type statements in a first language, and the second computer presents identification of types in a second language.

Preferably, the message generator at the first computer appends an identifier type to the type chain, and appends an identifier object to the object chain.

The invention also relates to a method for identifying a target component in an apparatus that has components related in a hierarchy. In a representing step, the components are represented by corresponding objects and the objects are thereby related in a type-object hierarchy. In a deriving message step, a message is derived from the type-object hierarchy; the message has a type chain in a parent-child direction and has an object chain also in the parent-child direction; both chains in combination identify a target object that corresponds to the target component. In a parsing step, the message is parsed to provide an identification of the target component with type and object as well as an identification of the parent components with types and objects.

Preferably, the identification of the target component is displayed with type statements, wherein the type statements are provided locally.

The invention also relates to a combination of complementary first and second computer program products, for use in a computer system to identify a target component of an apparatus that has a plurality of components related in a hierarchy.

Both computer program products have computer instructions that are distributed in the system as follows:

In the first computer program product to control a first computer, instructions represent the components by corresponding objects, and thereby relate the objects in a type-object hierarchy.

Also in the first computer program product, further instructions derive a message from the type-object hierarchy. The message has a type chain in a parent-child direction and an object chain also in the parent-child direction; both chains in combination identify a target object that corresponds to the target component.

In the second computer program product to control a second computer, instructions parse the message to provide identification of the target component with type and object as well as an identification of the parent components with types and objects.

A method for identifying a target object by a first computer run-time environment to a second run-time environment has the following steps: representing a plurality of objects by the first run-time environment, thereby relating the objects in a type-object hierarchy; deriving a message from the type-object hierarchy, the message with a type chain in a parent-child direction and an object chain also in the parent-child direction, wherein both chains in combination identify the target object; forwarding the message to the second run-time environment; and parsing the message by the second run-time environment to provide an identification of the target component with type and object as well as an identification of the parent components with types and objects.

Preferably, both run-time environments use different object models.

BRIEF DESCRIPTION OF THE DRAWINGS

FIGS. 4-5 illustrate details for an application on an application computer by example, wherein FIG. 4 illustrates a type hierarchy and FIG. 5 illustrates objects;

FIG. 6 illustrates a message with two chains;

FIG. 7 illustrates details of a service computer with a service application at the second location;

FIG. 9 illustrates first and second documents at first and second locations in a further embodiment of the present invention.

DETAILED DESCRIPTION OF THE INVENTION

For convenience, a list of references is provided prior to the claims. The current invention is useful for multi-lingual environments. In some embodiments, computers generate displays in different natural languages, such as German and English. To conveniently describe the invention in a single language, symbols ° and °° distinguish first and second natural languages, respectively. For example, "airplane°" stands for the German word "Flugzeug" and "airplane°°" stands for the English word "airplane", both in the same meaning. In a real implementation, these superscripts are not shown.

The exemplary scenario relates to airplane maintenance: At an airline office, a fleet manager operates an application computer. The computer evaluates a maintenance history record that identifies an airplane component—an air valve—to be checked. The computer automatically forwards a computer message to the airport. At the airport, a service computer interprets the message and displays an identification of the component to a technician.

In the example, the present invention provides advantages over the prior art: The service computer also displays the location of the valve in reference to a hierarchy of other airplane components such as the fuselage, wing, and engine. Application and service computer may use different natural languages adapted to the understanding of the manager and the technician, respectively. Application and service computers may use different operating systems and run-time environments. The software can be written in different programming languages.

Figure 1:
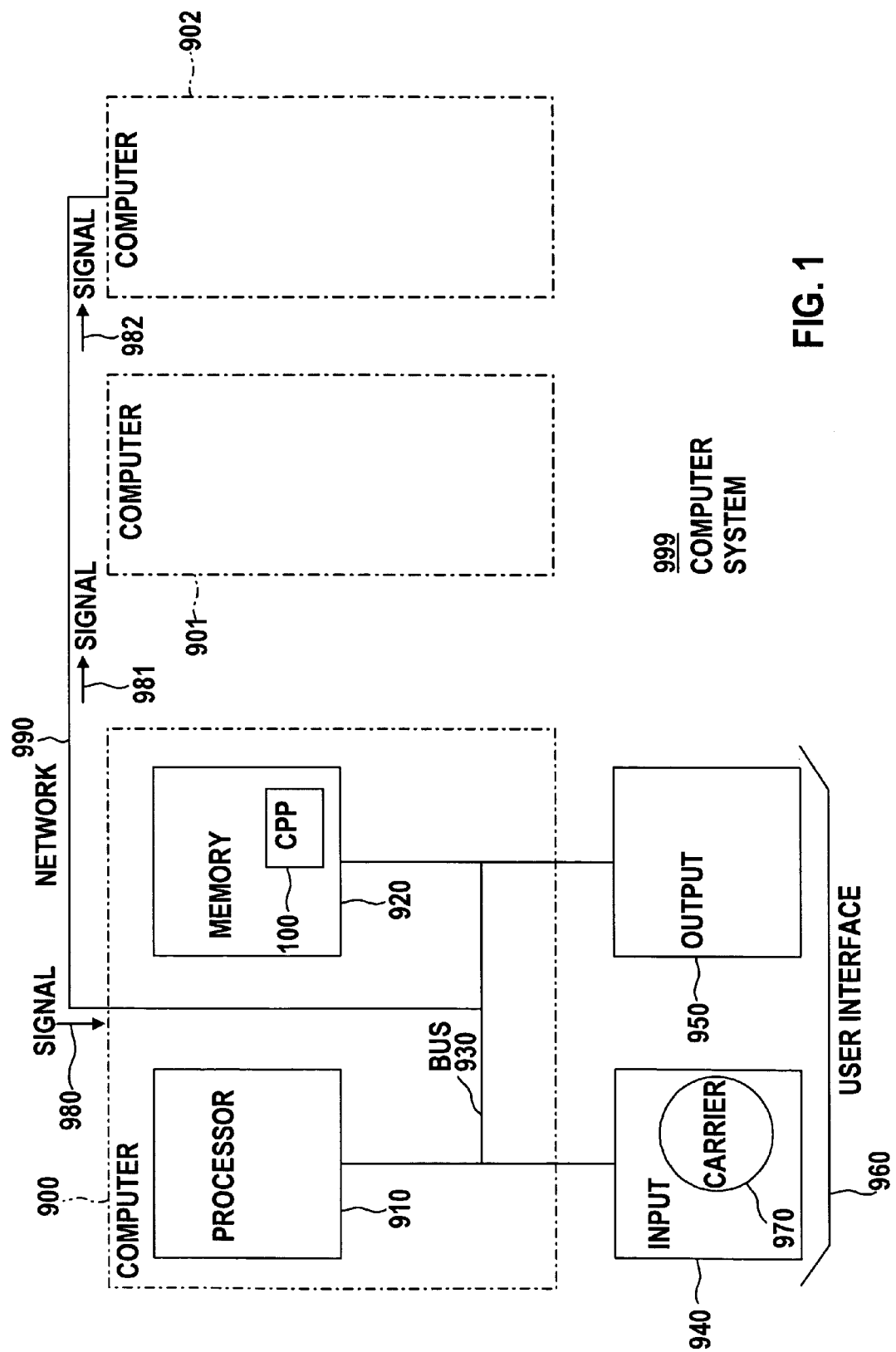
FIG. 1 illustrates a simplified block diagram of a computer network system having a plurality of computers.

FIG. 1 illustrates a simplified block diagram of exemplary computer system 999 having a plurality of computers 900, 901, 902 (or even more).

Computer 900 can communicate with computers 901 and 902 over network 990. Computer 900 has processor 910, memory 920, bus 930, and, optionally, input device 940 and output device 950 (I/O devices, user interface 960). As illustrated, the invention is implemented by computer program product 100 (CPP), carrier 970 and signal 980.

With respect to computer 900, computer 901/902 is sometimes referred to as "remote computer", computer 901/902 is, for example, a server, a peer device or other common network node, and typically has many or all of the elements described relative to computer 900.

Computer 900 is, for example, a conventional personal computer (PC), a desktop device or a hand-held device, a multiprocessor computer, a pen computer, a microprocessor-based or programmable consumer electronics device, a mini-computer, a mainframe computer, a personal mobile computing device, a mobile phone, a portable or stationary personal computer, a palmtop computer or the like.

Processor 910 is, for example, a central processing unit (CPU), a micro-controller unit (MCU), digital signal processor (DSP), or the like.

Memory 920 includes elements that temporarily or permanently store data and instructions. Although memory 920 is illustrated as part of computer 900, memory can also be implemented in network 990, in computers 901/902 and in processor 910 itself (e.g., cache, register), or elsewhere. Memory 920 can be a read only memory (ROM), a random access memory (RAM), or a memory with other access options. Memory 920 is physically implemented by computer-readable media, for example: (a) magnetic media, like a hard disk, a floppy disk, or other magnetic disk, a tape, a cassette tape; (b) optical media, like optical disk (CD-ROM, digital versatile disk—DVD); (c) semiconductor media, like DRAM, SRAM, EPROM, EEPROM, memory stick.

Optionally, memory 920 is distributed. Portions of memory 920 can be removable or non-removable. For reading from media and for writing in media, computer 900 uses well-known devices, for example, disk drives, or tape drives.

Memory 920 stores modules such as, for example, a basic input output system (BIOS), an operating system (OS), a program library, a compiler, an interpreter, and a text-processing tool. Modules are commercially available and can be installed on computer 900. For simplicity, these modules are not illustrated.

CPP 100 has program instructions and—optionally—data that cause processor 910 to execute method steps of the present invention. In other words, CPP 100 can control the operation of computer 900 and its interaction in network system 999 so that it operates to perform in accordance with the invention. For example and without the intention to be limiting, CPP 100 can be available as source code in any programming language, and as object code ("binary code") in a compiled form.

Although CPP 100 is illustrated as being stored in memory 920, CPP 100 can be located elsewhere. CPP 100 can also be embodied in carrier 970.

Carrier 970 is illustrated outside computer 900. For communicating CPP 100 to computer 900, carrier 970 is conveniently inserted into input device 940. Carrier 970 is implemented as any computer readable medium, such as a medium largely explained above (cf. memory 920). Generally, carrier 970 is an article of manufacture having a computer readable medium with computer readable program code to cause the computer to perform methods of the present invention. Further, signal 980 can also embody computer program product 100.

Having described CPP 100, carrier 970, and signal 980 in connection with computer 900 is convenient. Optionally, further carriers and further signals embody computer program products (CPP) to be executed by further processors in computers 901 and 902.

Input device 940 provides data and instructions for processing by computer 900. Device 940 can be a keyboard, a pointing device (e.g., mouse, trackball, cursor direction keys), microphone, joystick, game pad, scanner, or disc drive. Although the examples are devices with human interaction, device 940 can also be a device without human interaction, for example, a wireless receiver (e.g., with satellite dish or terrestrial antenna), a sensor (e.g., a thermometer), a counter (e.g., a goods counter in a factory). Input device 940 can serve to read carrier 970.

Output device 950 presents instructions and data that have been processed. For example, this can be a monitor or a display, cathode ray tube (CRT), flat panel display, liquid crystal display (LCD), speaker, printer, plotter, vibration alert device. Output device 950 can communicate with the user, but it can also communicate with further computers.

Input device 940 and output device 950 can be combined to a single device. Any device 940 and 950 can be provided optionally.

Bus 930 and network 990 provide logical and physical connections by conveying instruction and data signals. While connections inside computer 900 are conveniently referred to as "bus 930", connections between computers 900-902 are referred to as "network 990". Optionally, network 990 includes gateways which are computers that specialize in data transmission and protocol conversion.

Devices 940 and 950 are coupled to computer 900 by bus 930 (as illustrated) or by network 990 (optional). While the signals inside computer 900 are mostly electrical signals, the signals in network are electrical, electromagnetic, optical or wireless (radio) signals.

Networks are commonplace in offices, enterprise-wide computer networks, intranets and the Internet (e.g., world wide web). Network 990 can be a wired or a wireless network. To name a few network implementations, network 990 can be, for example, a local area network (LAN), a wide area network (WAN), a public switched telephone network (PSTN); an Integrated Services Digital Network (ISDN), an infra-red (IR) link, a radio link, like Universal Mobile Telecommunications System (UMTS), Global System for Mobile Communication (GSM), and Code Division Multiple Access (CDMA), or a satellite link.

A variety of transmission protocols, data formats and conventions are known, such as, for example, transmission control protocol/internet protocol (TCP/IP), hypertext transfer protocol (HTTP), secure HTTP, wireless application protocol (WAP), unique resource locator (URL), a unique resource identifier (URI), hypertext markup language (HTML), extensible markup language (XML), extensible hypertext markup language (XHTML), wireless markup language (WML), and Standard Generalized Markup Language (SGML).

Interfaces coupled between the elements are also well known in the art. For simplicity, interfaces are not illustrated. An interface can be, for example, a serial port interface, a parallel port interface, a game port, a universal serial bus (USB) interface, an internal or external modem, a video adapter, or a sound card.

Computer and program are closely related. As used hereinafter, phrases, such as "the computer provides" and "the program provides", are convenient abbreviation to express actions by a computer that is controlled by a program.

Figure 2:
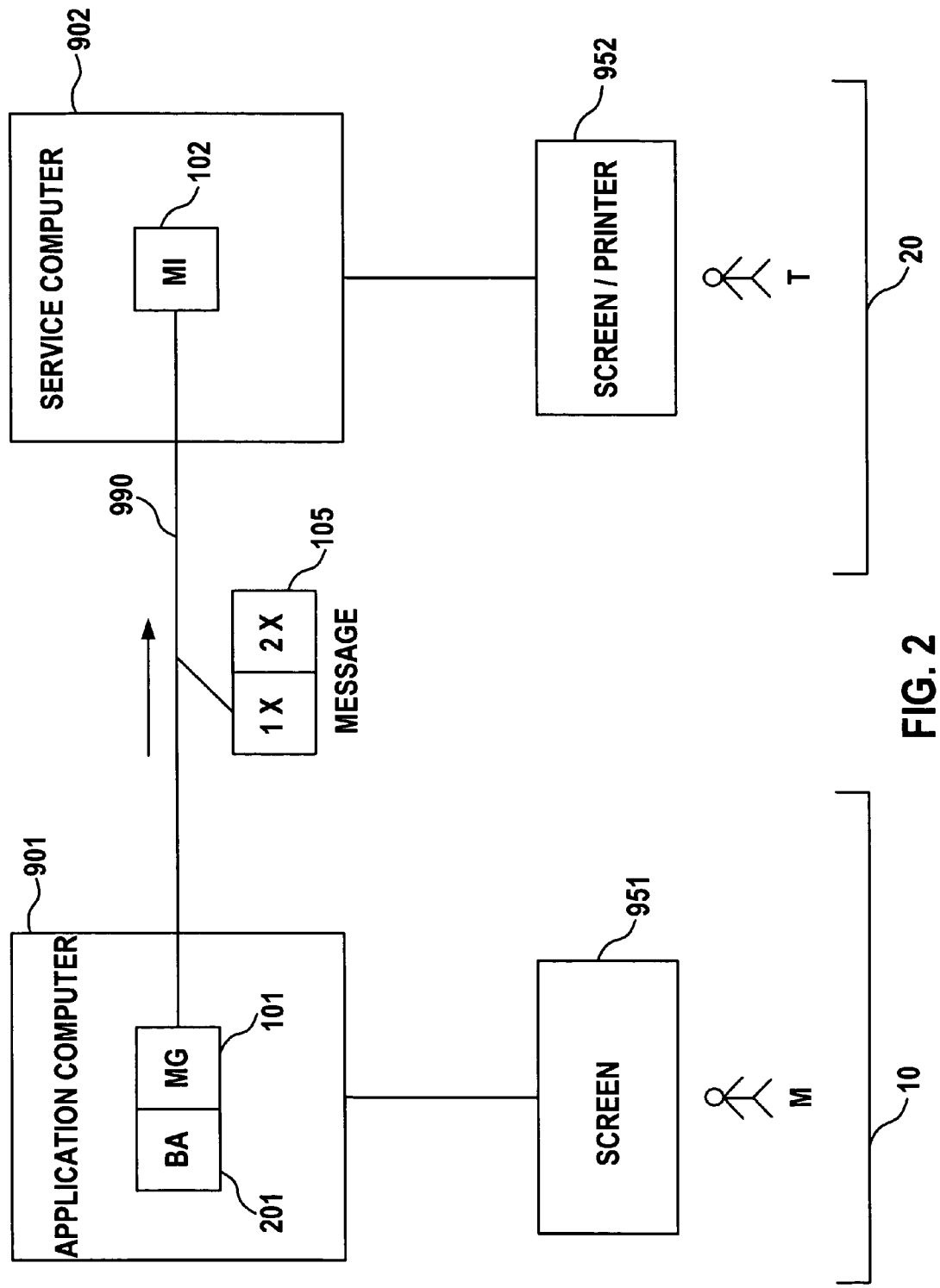
FIG. 2 illustrates a simplified exemplary scenario for the present invention with a first location and a second location.

FIG. 2 illustrates the simplified exemplary scenario for the present invention with first location 10 (e.g., airline office) and second location 20 (e.g., airport). At location 10, application computer 901 has output device 951 (e.g., screen) to communicate information to a first user (e.g., manager M). Computer network 990 carries message 105 from location 10 to location 20. At location 20, service computer 902 has output device 952 (e.g., screen or printer) to communicate information to a second user (e.g., technician T).

Computer programs are provided as follows: Computer 901 uses business application 201 (BA), for example, a commercially available enterprise resource planning (ERP) program. Computer-program products (i.e. CPP 100) according to the invention are message generator 101 (MG) at computer 901 and message interpreter 102 (MI) at computer 902.

Generally, in computer system 901/902, application computer 901 executes business application 201 to represent components of an apparatus (e.g., airplane) by corresponding objects in a type-object hierarchy. Message generator 101 receives type-object hierarchy information from application 201 and provides message 105 with type chain 1x and object chain 2x. Both chains in combination identify the target object that corresponds to the target component of the apparatus. Service computer 902 with message interpreter 102 parses both chains to provide identification of the target and parent components with types and objects. Computer 901 presents (e.g., screen 951) type-object hierarchy information to user M by adding type statements in a first natural language; computer 902 presents (e.g., screen 952) type identification to user T in a second natural language.

Besides optionally using different languages, technically, the message communication according to the present invention is independent of the object models in both environments. There is no need to go call through multiple objects in the environment of service computer 902.

Figure 3:
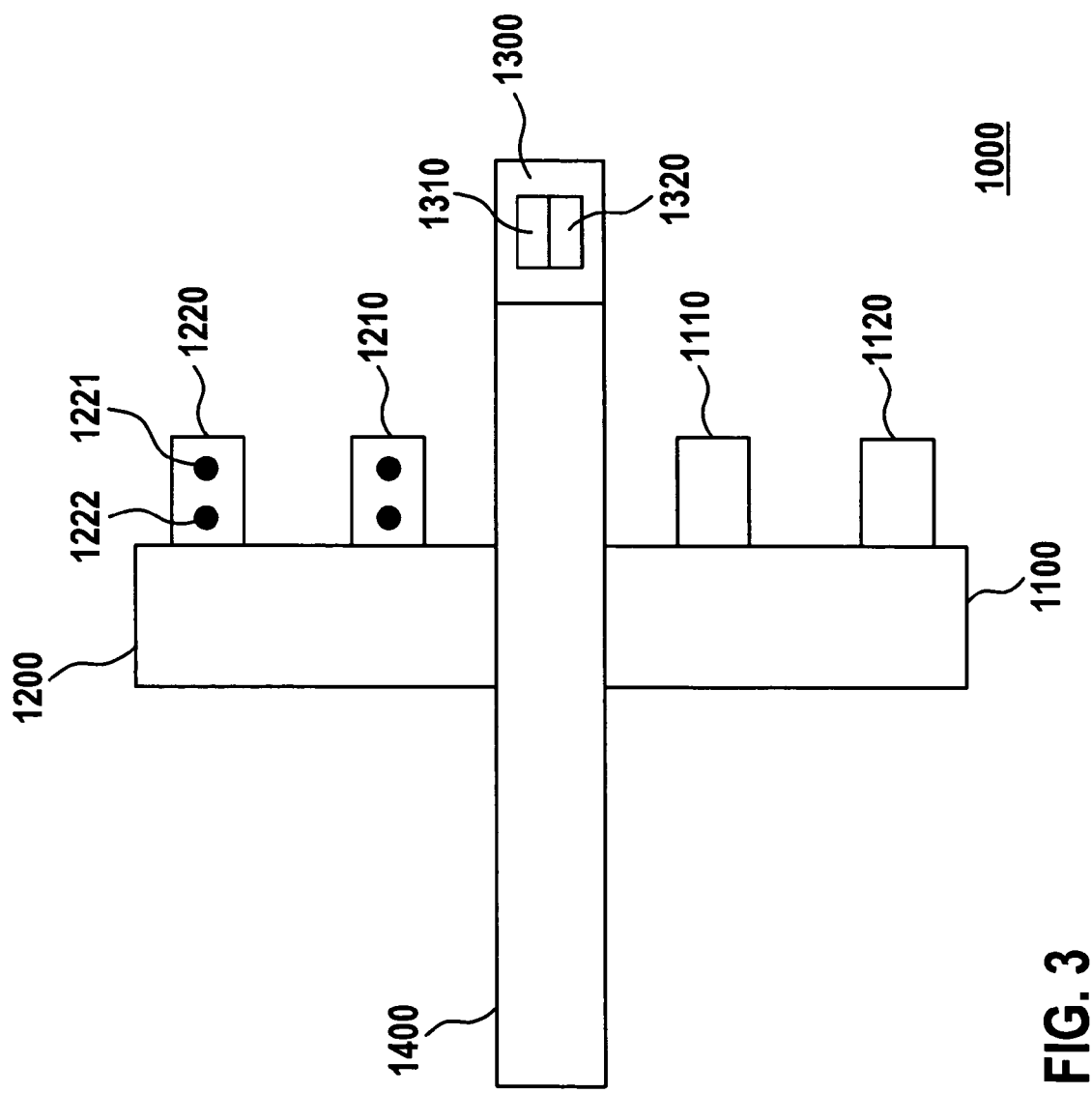
FIG. 3 illustrates a simplified plan view of an airplane.

FIG. 3 illustrates airplane 1000 with the following components: fuselage 1400; starboard wing 1100 (right) with inner engine 1110 and outer engine 1120; port wing 1200 (left) with inner engine 1210 and outer engine 1220; cockpit 1300 with pilot-seat 1310 and co-pilot-seat 1320.

Each engine has a plurality of valves illustrated by circle symbols, such as fuel valve 1221 and air valve 1222 at engine 1220. For convenience of explanation, the airplane 1000 itself is considered as a root component. In the following explanation, valve 1222 is a target component.

Figure 4:
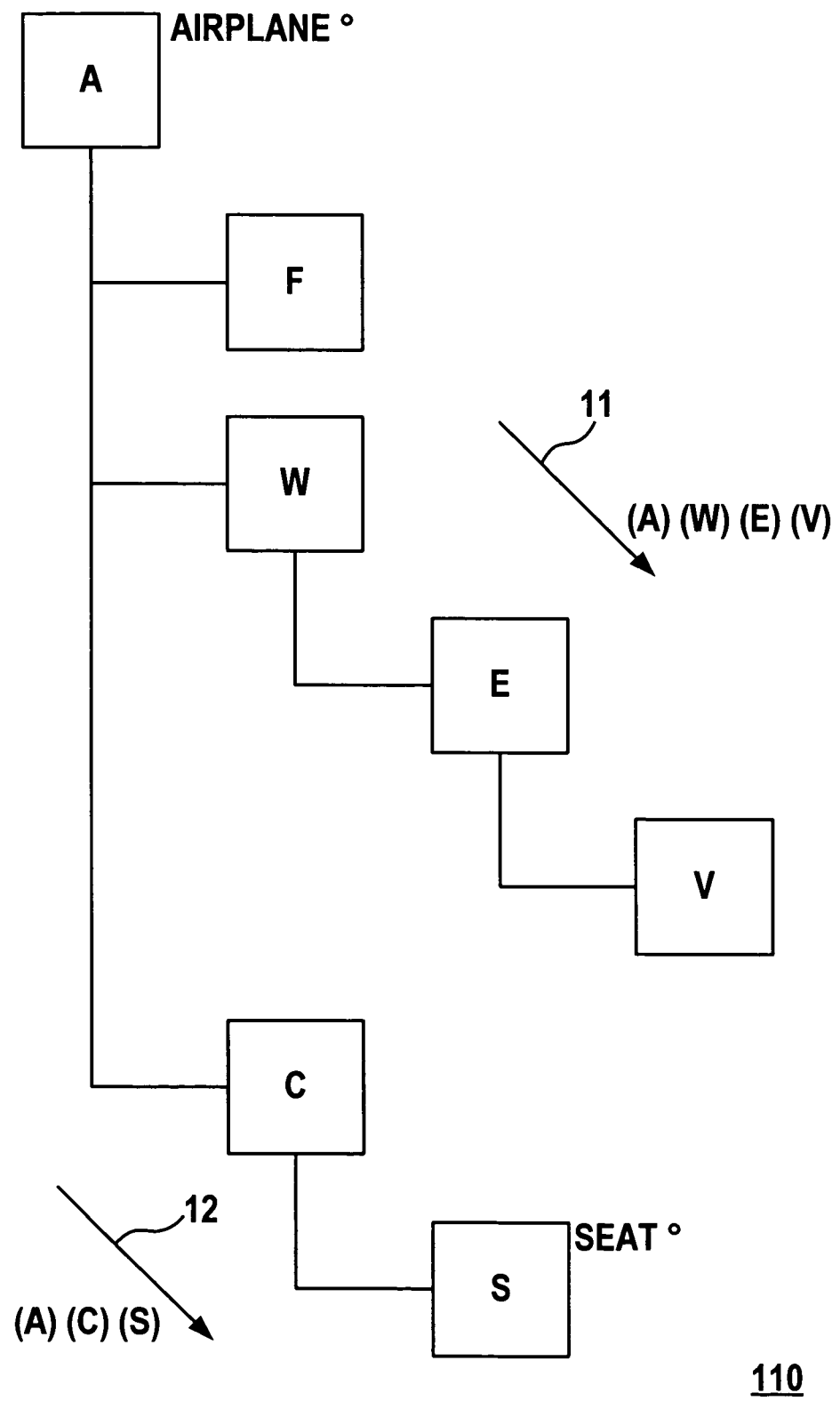
Figure 5:
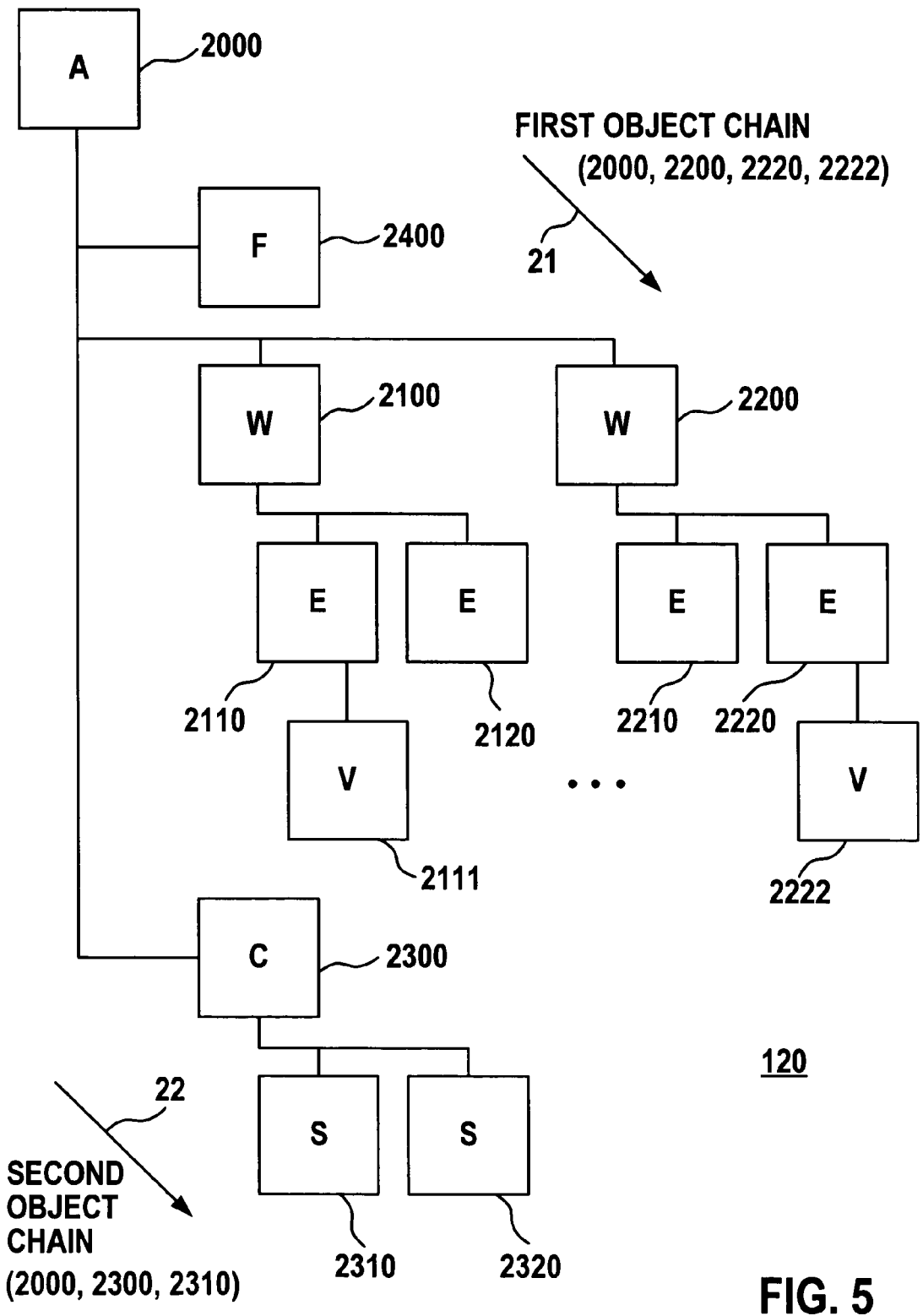

FIGS. 4-5 illustrate details for application 201 on application computer 901 (location 10) by way of example. Application 201 relates objects in type-object hierarchy 110/120. Application 201 hands over hierarchy information in the form of chains to message generator 101. The figures illustrate how application 201 and generator 101 create message 105. Conveniently—but not mandatorily—application 201 presents these or similar pictures to the manager (via screen 951). Conveniently, hierarchy information is symbolized by trees; persons of skill in the art can store hierarchy information by a variety of computer programming means, such as tables, variables, records, etc.

FIG. 4 illustrates type hierarchy tree 110 in the airplane example. Application 201 (cf. FIG. 2) represents the components by object-types, for example: airplane type (A), fuselage type (F), wing type (W), engine type (E), cockpit type (C), seat type (S), and valve type (V). An exemplary hierarchy for all airplanes is: type (A) directly above (F), (W) and (C) (i.e. A as parent); type (W) directly above (E); type (C) directly above (S); and type (E) directly above (V). The exemplary hierarchy follows the rule that a parent component contains one or more collections of child components (i.e., airplane contains fuselage, wings etc.).

Application 201 conveniently indicates the type by text explanations (i.e., statements) to the manager in the first language, i.e., AIRPLANE°, . . . , SEAT°.

Hierarchy chains can be defined to each type. For example, a first type chain (arrow 11) (A), (W), (E), (V) leads to the valve type (V); a second type chain (arrow 12) (A), (C), (S) leads to the seat type (S). A type alone does not yet represent a component. Representation of components follows next.

FIG. 5 illustrates object hierarchy tree 120. Each type has one or more objects. For convenience, reference numbers for objects and types are similar (1xxx, 2xxx). Each object has a type. In the example, the objects are: airplane object 2000 (type A), fuselage object 2400 (type F), wing objects 2100, 2200 (type W), engine objects 2110, 2120, 2210, 2220 (type E), valve objects 2111 . . . 2222 (type V), cockpit object 2300 (type C), and seat objects 2310, 2320 (type S). The objects can have properties (not illustrated), such as to distinguish starboard and port wing, inner and outer engines, pilot and copilot seat, air and fuel valve, etc.

In combination with the above type chains, object chains with object numbers identify a component. For example, the first object chain (arrow 21, objects 2000, 2200, 2220, 2222) identifies air valve 1222 (i.e. the target) by hierarchical identification. Reading the objects from left to right, object 2000 stands for airplane 1000, object 2200 for port wing 1200, object 2220 for outer engine 1220 and object 2222 for air valve 1222. Likewise, the second object chain (arrow 22, objects 2000, 2300, 2310) in combination with the second type chain (cf. 12 in FIG. 4) identifies the pilot seat.

Object and type chains alone are often not sufficient to identify similar components. This is especially important for complex things like airplanes where almost all components are provided in redundancies. Representation of components by identification (ID) numbers follows next:

Appending an identifier type (I) to the type chain, and appending an identifier object to the object chain identifies each component. For example, the extended type chain (A), (W), (E), (V), (I) and the modified object chain (D-ABCD, 2200, 2220, 2222, 9876) stand for: the only airplane with D-ABCD (as international designation), the port wing, the outer engine, and the air valve with the identification number "9876" as the target component.

Message builder 101 uses both chains to compose message 105, as explained in the following.

FIG. 6 illustrates a simplified diagram of message 105. Message 105 comprises the type chain and the object chain with identifiers for the root component (i.e. airplane) and the target component. Examples for message 105 that identifies the air valve are:

EXAMPLE (i)

A, D-ABCD/W, 2200/E, 2220/V, 2222/I, 9876

First delimiters (comma) stand between type and object; second delimiters (slash) indicate hierarchy.

EXAMPLE (ii), cf. FIG. 6

A, W, E, V, I
/
D-ABCD, 2200, 2220, 2222, 9876

Message 105 is separated into two portions (slash): one for the type chain, the other for the object chain.

EXAMPLE (iii)

Airplane, Wing, Engine, Valve, Identifier
/
D-ABCD, port wing, outer engine, air valve, 9876

Message 105 is also separated into two portions, types and objects are given in long form.

EXAMPLE (iv)

A, W, E, V, I
/
D-ABCD, 2, 2, 2, 9876

Message 105 is separated into two portions, references are abbreviated: wing 2 (out of wings 1 and 2), engine 2 (out of engine 1 and 2 on wing 2), valve 2 (out of many others)

EXAMPLE (v)

Message 105 is divided into two separate messages that are communicated consecutively. The first message communicates the types "Airplane, Wing, Engine, Valve, Identifier" in that order. The second message communicates to use content "D-ABCD, 2200, 2220, 2222, 9876" in combination with the type order.

As in the examples (i) to (v), the message uniquely identifies the target component by a unique path. The path has all elements (type, object, ID) to navigate to the target. Persons of skill in the art can provide other message formats without departing from the present invention. Especially, the delimiter characters (slash, comma) can be replaced by others. Also, persons of skill in the art can add routing or other address information so that (a) message 105 reaches interpreter 102 at service computer 902 and (b)—optionally— interpreter 102 returns a response to application computer 901. This is especially useful for the user of computer 902 (i.e. technician) to acknowledge message receipt or to return comments.

Portions of two messages can be identical. As long as one portion is different, the component is properly identified. For example, the message "Airplane, landing gear, wheel, air valve, I/D-ABCD, 2, 2, 2, 9876" identifies a completely different air valve, one that keeps the air pressure in one of the wheel of the left gear.

Preferably, message 105 is implemented as a string of characters. In respect to the above mentioned different runtime environment with different object-models, the string format is common for both environments. For example, application 201 (at computer 901) implements identification object "9876" as an integer, while interpreter 102 in the environment of computer 902 uses a string format with a limited number of characters. In other words, both object models (in both environments) are mapped.

FIG. 7 illustrates details of service computer 902 with service application 202 at second location. Illustrated is the display provided to device 952. Message interpreter 102 at computer 902 (cf. FIG. 2, MI) is part of service application 202. Application 202 and interpreter 102 can be the same. Interpreter 102 (or "parser") evaluates message 105 and provides information to the second user (i.e. technician). Thereby, interpreter 102 serves the following purposes: First, to communicate identification and hierarchy relation to the second user (i.e. technician), and second, to translate terms for types or objects into an appropriate natural language.

Interpreter 102 has program code to translate the first chain into terms that are understood by the second user; Interpreter 102 has further program code to relate the second chain to the terms.

For example, interpreter provides the following output to the technician (on device 952, second language)

| | |
|---|---|
| AIRPLANE°° | D-ABCD |
| WING°° | port°° |
| ENGINE°° | outer°° |
| CHECK°° | air valve°° |
| IDENTIFICATION°° | 9876 |

Interpreter 102 has added predefined instruction "CHECK" to the technician (second user).

Figure 8:
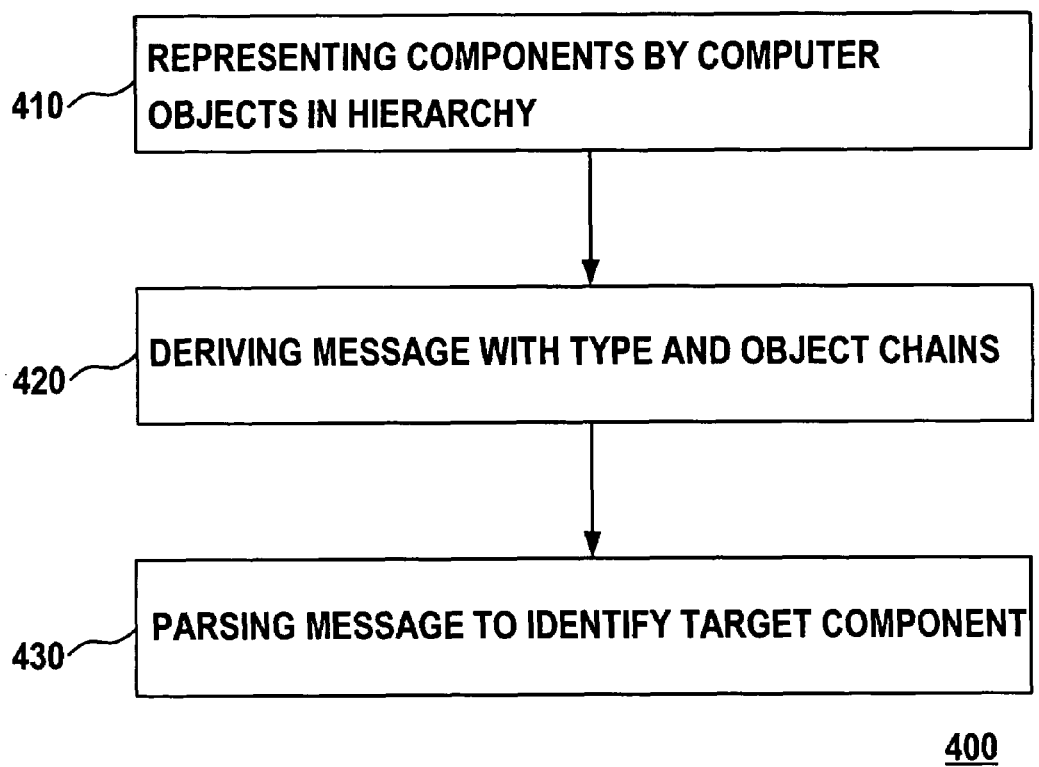
FIG. 8 illustrates a simplified method flow chart diagram of a method of the present invention.

FIG. 8 illustrates a simplified method flow chart diagram of a method of the present invention. Method 400 for identifying target component 1222 in apparatus 1000 that has components 1xxx related in a hierarchy comprises representing components by objects in the hierarchy; deriving a message with type and object chains from the hierarchy; and parsing the message to identify the target component.

Details for method 400 are explained referring to the first example:

The step of representing 410 components 1xxx by corresponding objects 2xxx, thereby relating objects 2xxx in type-object hierarchy 110/120 (cf. FIGS. 4-5);

The step of deriving 420 message 105 from type-object hierarchy 110/120, wherein message 105 includes type chain 11 in a parent-child direction and object chain 21 also in the parent-child direction, and both chains 11, 21 in combination identify target object 2222 that corresponds to target component 1222; and The step of parsing 430 message 105 to provide identification of target component 1222 with type (V) and object 2222 as well as identification of the parent components with types (A)(W)(E) and objects 2000, 2200, 2220.

Optionally, method 400 further includes displaying the identification of the target component (cf. FIG. 7) with type statements (e.g., AIRPLANE°°). The type statements are provided locally by service computer 902. For example, persons of skill in the art can use a look-up table to store statements (in °° language) that correspond to the types.

Having described the present invention with respect to identifying a component is convenient, but not necessary. The present invention can also be described as identifying target object 2222 by a first computer run-time environment (i.e. computer 901 with operating system) to a second run-time environment (i.e. computer 902 with operating system) by the following steps:

Representing 410 (cf. FIG. 8) plurality of objects 2xxx by the first run-time environment, thereby relating objects 2xxx in a type-object hierarchy (110/120);

Deriving 420 message 105 from the type-object hierarchy, message 105 with type chain 11 in a parent-child direction and object chain 21 also in the parent-child direction, wherein both chains 11, 21 in combination identify target object 2222;

Forwarding message 105 to the second run-time environment (cf. FIG. 2); and

Parsing 430 message 105 by the second run-time environment to provide identification of target component 1222 with types (V) and objects 2222 as well as identification of the parent components with types (A)(W)(E) and objects 2000, 2200, 2220.

It is an advantage of the present invention, that first and second run-time environments optionally use different object models.

FIG. 9 illustrates first and second documents at first and second locations in a further embodiment of the present invention. Instead of identifying a target component in an apparatus (e.g., airplane) with components, the present invention also allows identification of entries in documents (i.e. tables) that relate the entries in hierarchy. As in FIG. 9, the user of computer 901 (e.g. manager) selects an entry in a first table, message 105 conveys this information to computer 902 that presents the selection in a different environment (here: different language) to the technician.

REFERENCES 11, 12 type chains
21, 22 object chains
10 first location
101 message generator (MG)
102 message interpreter (MI)
105 message
110 type hierarchy tree
120 object hierarchy tree
1xxx airplane components
1222 target component
20 second location
201 business application (BA)
202 service application
2xxx objects
400, 4xx method, steps
9876 exemplary identification
9xx computer hardware, for example
901 application computer
902 service computer
951, 952 output devices
990 network
A, F, W, E, C, S, V, types
I
M, T first and second users
X any digit

What is claimed is:

1. A computer system for identifying a target component in an apparatus that has components related in a hierarchy, the computer system comprising:
   a first computer operable to execute a first application, wherein the first application relates objects representing corresponding components in both a type hierarchy identifying types of components and a separate object hierarchy identifying information associated with objects, wherein the type hierarchy and the object hierarchy identify the components in a first natural language;
   a second computer coupled to the first computer via a network;
   wherein the first computer includes a message generator operable to receive information relating to both the type hierarchy and the object hierarchy from the first application and the message generator further operable to provide to the second computer a message comprising a type chain identifying a path in the type hierarchy in a parent-child direction and an object chain identifying a path in the object hierarchy in the parent-child direction, wherein the type chain identifies a type node associated with a target object and the object chain identifies an object node associated with the target object, wherein a combination of the type node and the object node identifies the target object that corresponds to the target component, and wherein a combination of ascendants of the type node and ascendants of the object node correspond to parent components; and
   wherein the second computer has a message interpreter operable to parse both chains to provide identification of the target component with the combination of the type node and the object node as well as to provide identification of the parent components with the combination of ascendants of the type node and ascendants of the object node, wherein the identification provided by the message interpreter further includes translating information from the first natural language to a different natural language using both the chains.

2. The computer system of claim 1, wherein the first computer presents type-object hierarchy information to a first user and thereby adds type statements in a first language, and wherein the second computer presents identification of types in a second language.

3. The computer system of claim 1, wherein the message generator at the first computer is operable to append an identifier type to the type chain, and to append an identifier object to the object chain.

4. A method for identifying a target component in an apparatus that has components related in hierarchy, the method comprising:
   representing the components by corresponding objects by a first application in a first computer, thereby relating objects in both a type hierarchy identifying types of components and a separate object hierarchy identifying information associated with objects, wherein the type hierarchy and the object hierarchy identify the components in a first natural language;
   deriving a message, by a first message generator in the first computer, from information for both the type hierarchy and the object hierarchy, the message with a type chain identifying a path in the type hierarchy in a parent-child direction and an object chain identifying a path in the object hierarchy in the parent-child direction, wherein the type chain identifies a type node associated with a target object and the object chain identifies an object node associated with the target object, wherein a combination of the type node and the object node identifies the target object that corresponds to the target component, and wherein a combination of ascendants of the type node and ascendants of the object node correspond to parent components;
   providing the message to a second computer; and
   parsing the message, by a message interpreter in the second computer, to provide identification of the target component with the combination of the type node and object node as well as to provide identification of the parent components with the combination of ascendants of the type node and ascendants of the object node, wherein the identification further includes translating information from the first natural language to a different natural language using both type and object information.

5. The method of claim 4, further comprising displaying the identification of the target component with type statements, wherein the type statements are provided locally.

6. A combination of complementary first and second computer program products, for use in a computer system to identify a target component of an apparatus that has a plurality of components related in hierarchy, both computer program products having a machine-readable medium storing instructions for causing data processing, instructions are distributed in the system as follows:
   in the first computer program product to control a first computer, the instructions operable to represent the components by corresponding objects, and thereby to relate objects in both a type hierarchy identifying types of components and a separate object hierarchy identifying information associated with objects, wherein the type hierarchy and the object hierarchy identify the components in a first natural language;
   in the first computer program product, the instructions further operable to derive a message from information for both the type hierarchy and the object hierarchy and to provide the message to a second computer, the message comprising a type chain identifying a path in the type hierarchy in a parent-child direction and an object chain identifying a path in the object hierarchy in the parent-child direction, wherein the type chain identifies a type node associated with a target object and the object chain identifies an object node associated with the target object, wherein a combination of the type node and the object node identifies the target object that corresponds to the target component, and wherein a combination of ascendants of the type node and ascendants of the object node correspond to parent components; and
   in the second computer program product to control the second computer, the instructions operable to parse the message to provide identification of the target component with the combination of the type node and the object node as well as to provide identification of the parent components with the combination of ascendants of the type node and ascendants of the object node, wherein the identification further includes translating information from the first natural language to a different natural language using both type and object information.

7. A method for identifying a target component by a first computer run-time environment to a second run-time environment, the method comprising:
   representing a plurality of objects by the first run-time environment, thereby relating the objects in both a type hierarchy identifying types of components and a separate object hierarchy identifying information associated with objects, wherein the type hierarchy and the object hierarchy identify the components in a first natural language;
   deriving a message from information for both the type hierarchy and the object hierarchy by the first run-time environment, the message comprising a type chain identifying a path in the type hierarchy in a parent-child direction and an object chain identifying a path in the object hierarchy in the parent-child direction, wherein the type chain identifies a type node associated with a target object and the object chain identifies an object node associated with the target object, wherein a combination of the type node and the object node identifies the target object that corresponds to the target component, and wherein a combination of ascendants of the type node and ascendants of the object node correspond to parent components;
   forwarding the message to the second run-time environment; and
   parsing the message by the second run-time environment to provide identification of the target component with the combination of the type node and the object node as well as to provide identification of the parent components with the combination of ascendants of the type node and ascendants of the object node, wherein the identification further includes translating information from the first natural language to a different natural language using both type and object information.

8. The method of claim 7, wherein first and second run-time environments use different object models.

* * * * *

UNITED STATES PATENT AND TRADEMARK OFFICE
CERTIFICATE OF CORRECTION

PATENT NO.       : 7,624,399 B2
APPLICATION NO. : 10/811063
DATED            : November 24, 2009
INVENTOR(S)      : Wolfgang Pfeifer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 436 days.

Signed and Sealed this

Twenty-sixth Day of October, 2010

David J. Kappos
*Director of the United States Patent and Trademark Office*